March 12, 1968  W. V. C. VAN BEEK  3,372,583
DEVICE FOR MEASURING TACK
Filed Sept. 9, 1964  4 Sheets-Sheet 1
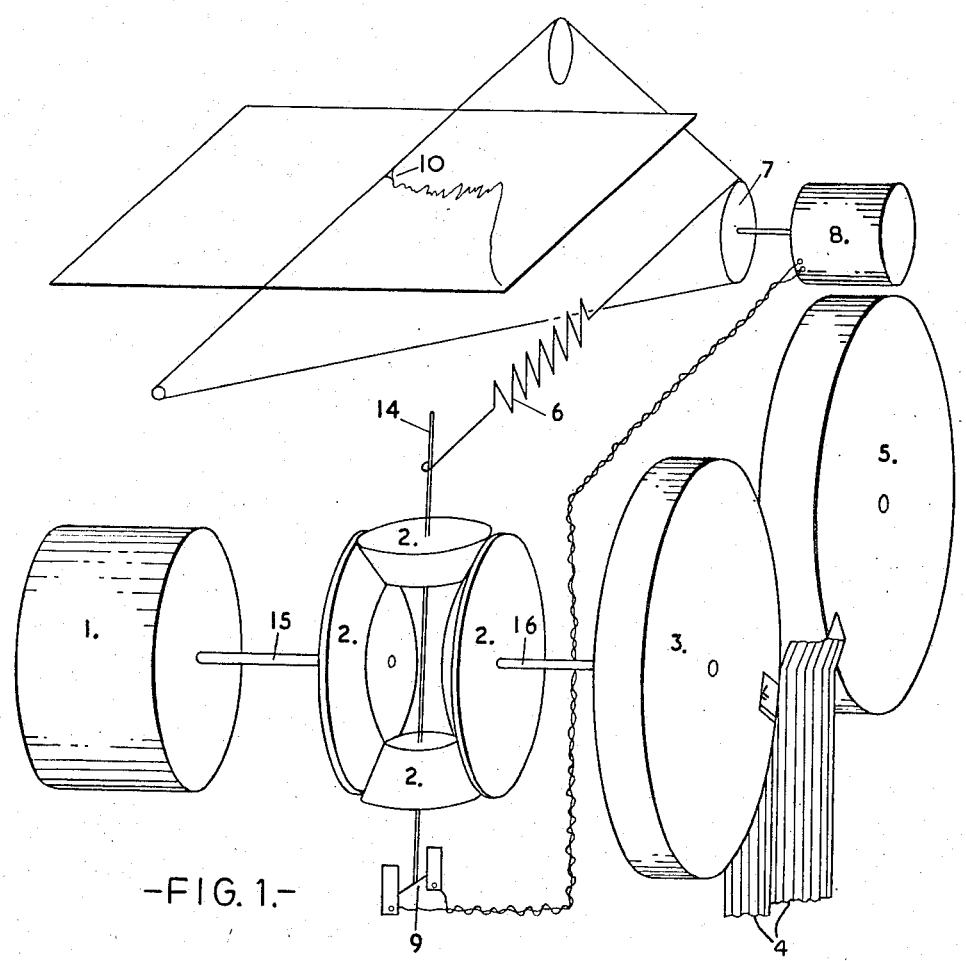
-FIG. 1.-
INVENTOR:
WALDEMAR VICTOR CONRAD VAN BEEK
BY
Jacob L. Kollin,
ATTORNEY March 12, 1968 W. V. C. VAN BEEK 3,372,583
DEVICE FOR MEASURING TACK
Filed Sept. 9, 1964 4 Sheets-Sheet 2
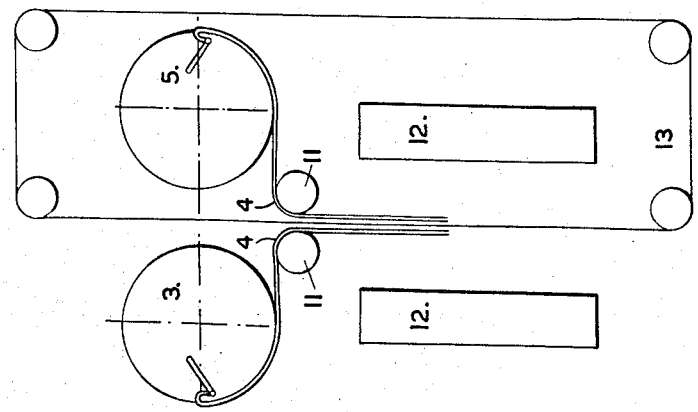
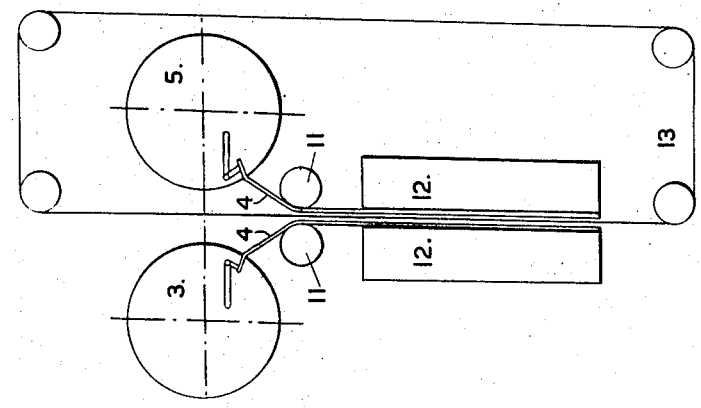
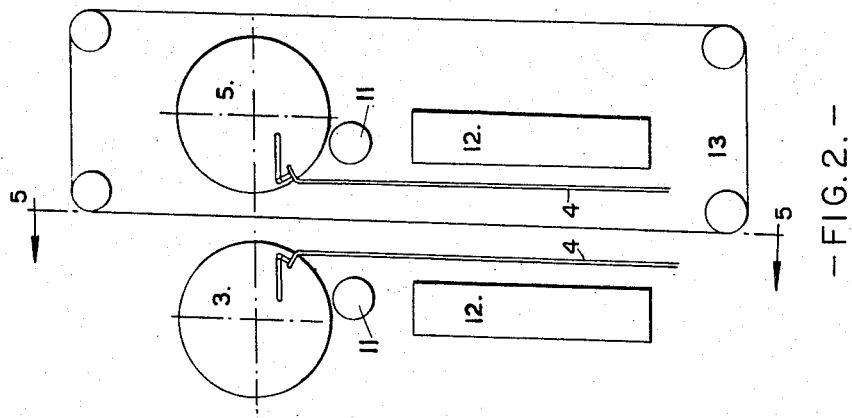
INVENTOR:
WALDEMAR VICTOR CONRAD VAN BEEK
BY
Jacob L. Kollin,
ATTORNEY March 12, 1968
W. V. C. VAN BEEK
3,372,583
DEVICE FOR MEASURING TACK
Filed Sept. 9, 1964
4 Sheets-Sheet 3
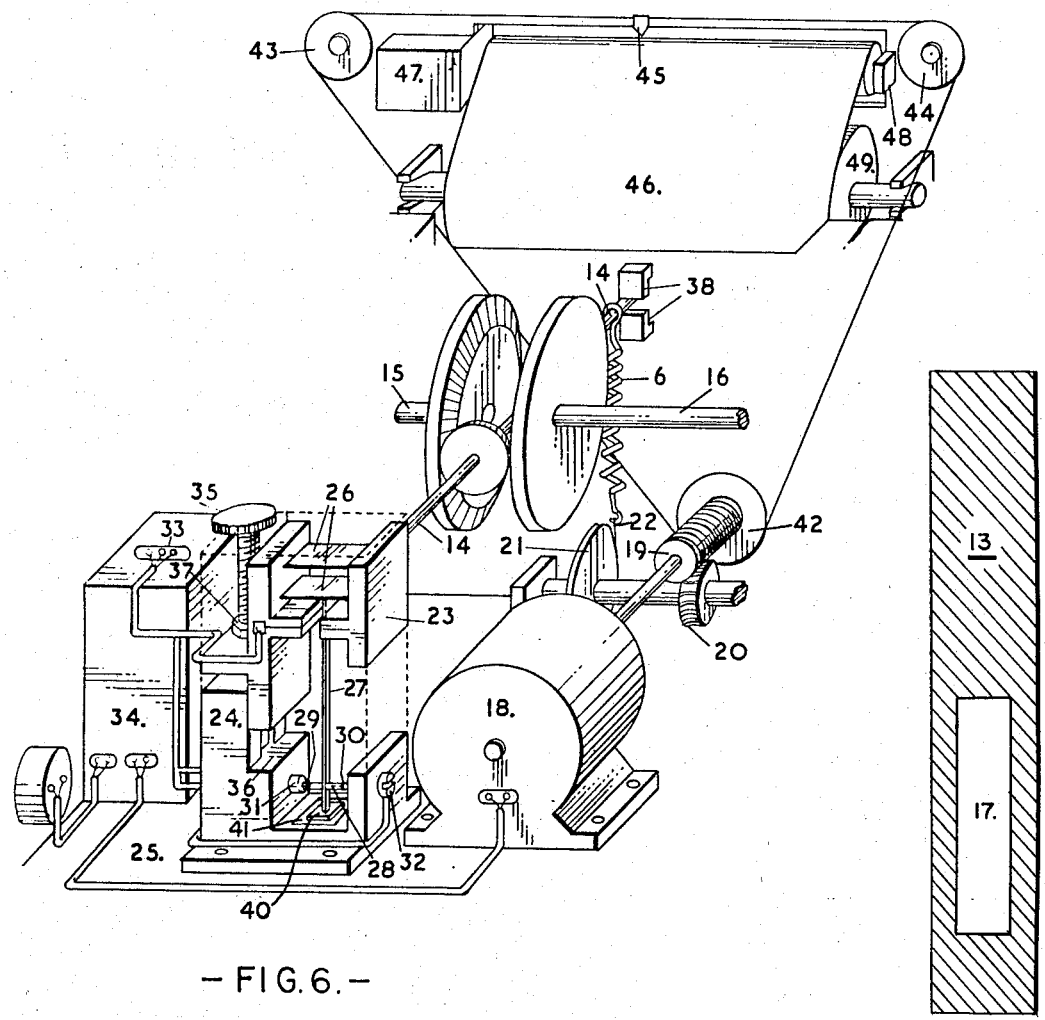
−FIG.6.−
−FIG.5.−
INVENTOR:
WALDEMAR VICTOR CONRAD VAN BEEK
BY Jacob L. Kollin
ATTORNEY March 12, 1968 W. V. C. VAN BEEK 3,372,583
DEVICE FOR MEASURING TACK
Filed Sept. 9, 1964 4 Sheets-Sheet 4
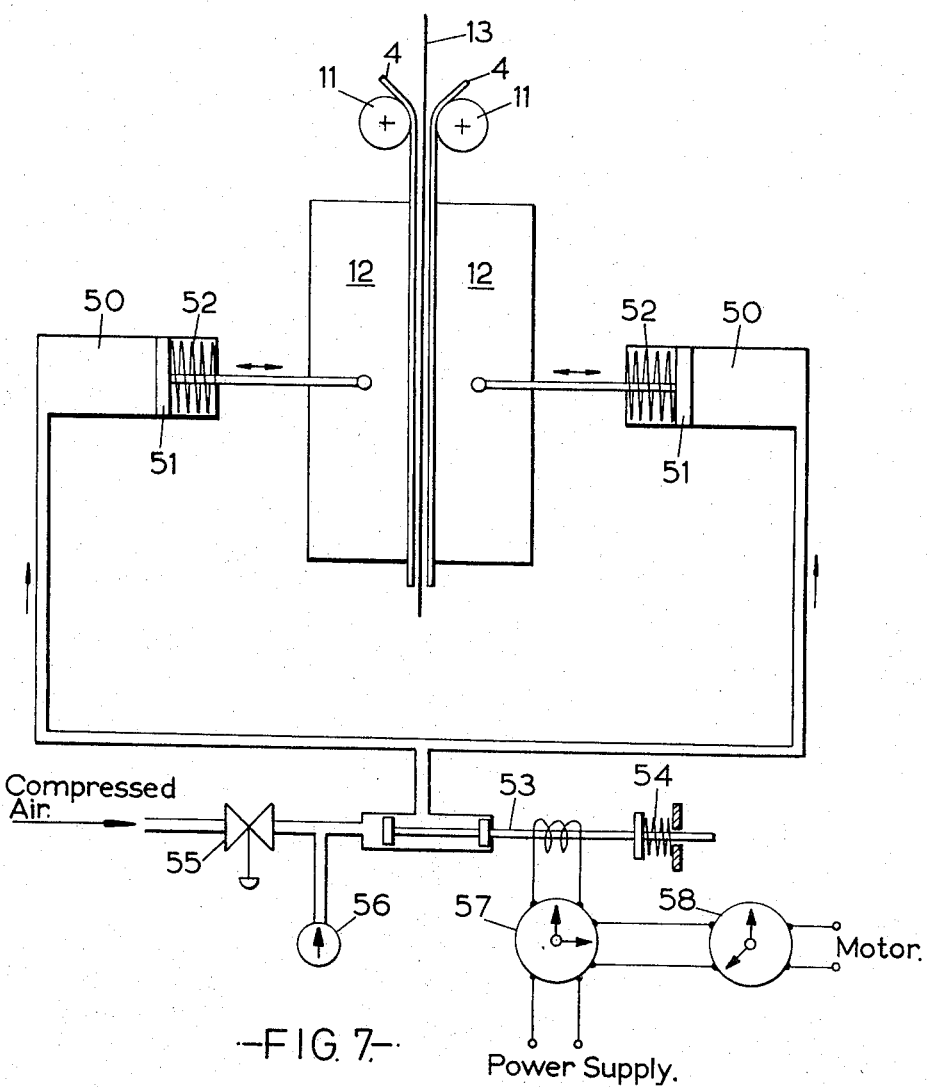
-FIG. 7-
INVENTOR:
WALDEMAR VICTOR CONRAD VAN BEEK
BY
Jacob L. Kollin
ATTORNEY

United States Patent Office

3,372,583
Patented Mar. 12, 1968

3,372,583
DEVICE FOR MEASURING TACK
Waldemar V. C. Van Beek, Bussum, Netherlands, assignor to Ketjen Carbon Naamloze Venootschap, Amsterdam, Netherlands
Filed Sept. 9, 1964, Ser. No. 395,334
Claims priority, application Netherlands, Sept. 18, 1963, 297,734
6 Claims. (Cl. 73—150)

This invention relates to a device for the measurement of tack.

In the rubber industry, especially in the tire manufacturing industry, use is made often of the tack or adhesion of unvulcanized rubber in the manufacture of rubber articles from rubber and/or rubber-coated-fabric sheets or plies placed on each other. These sheets or plies must stay in their position during the further handling prior to the vulcanization. All unvulcanized natural rubbers possess enough natural tack or adhesion to comply with the requirements in industry, but not all synthetic rubbers do. Therefore tackifying agents have to be incorporated in the synthetic rubbers and for this reason it has become very important to have a method and/or apparatus for measuring the tack of rubber.

By the term "tack" is meant the adhesion of rubber, which term distinguishes tack from stickiness.

The basic principles of the determination of tack are:
(1) Producing contact between surfaces by applying a force during a short time;
(2) Separating the surfaces while measuring the required force.

Various known tackmeters work according to these principles, but these tackmeters are typical laboratory instruments requiring skill and careful handling, consequently they are not adequate for factory control work.

In Trans. Inst. Rubber Ind., 33, 58 (1957) a practical apparatus is described, developed by B. Pickup and based along the principles given above.

This practical tackmeter is purposely kept as simple as possible. This led to a great personal influence on the test results by the operator. Also due to the small surfaces stuck together in each test, the variation of the test results is rather large, even after replacing human effort by a motor.

The present invention provides a tackmeter designed to combine the reproducibility and sensitivity of a laboratory apparatus with the ruggedness and the ease of operation necessary for a factory control instrument.

This is accomplished by the following:
(A) Instead of separating the plies by pulling perpendicularly to the surfaces (block test) a strip test which allows for a larger test surface has been chosen.
(B) Compression force and compression time are variable.
(C) a controllable relaxation time is possible between compression and pulling.
(D) Different speeds for separating the plies can be used.
(E) Reading and averaging of the results are facilitated.

According to the invention the tackmeter comprises two motor driven wheels, on which rubber covered fabric can be clamped, compression clamps, means for defining the area of contact between the plies to be tested, means for governing the compression force, the compression and relaxation time, a differential gearing system situated in the driving axle between motor and one of the driven wheels, a detecting system to detect the movement of the spider shaft, a compensating system for compensating the detected movement and a recording system to record the compensation force, which is a measure for the tack.

According to the principle of the invention the torque of the driving axle is transferred to the spider shaft with respect to a fixed point of the frame and that change of this torque, caused by the separation of the plies and thus by the tack is determined by measuring the force needed to keep the spider shaft stationary during the separation.

The invention will be described further, by way of example, with reference to the accompanying drawings, in which:

FIG. 1 is a schematic partial view of the tackmeter in accordance with the invention;

FIG. 2, 3 and 4 are schematic views, showing the clamping and compression system of the tacktester. FIG. 2 shows the plies clamped to the wheels: FIG. 3 illustrates the pressing of the plies on each other; FIG. 4 shows the separation of the plies; FIG. 5 represents a transverse sectional view along the line 5—5 of FIG. 2 and shows the means defining the test surface and FIG. 6 is a diagrammatic perspective view showing the measuring system.

FIG. 7 is a schematic illustration of a timer, valve and pressure control.

Referring to FIG. 1, a motor 1 drives via a differential 2 a disk 3, provided with a notch. A similar second disk 5 is at the side of 3 and is also driven by motor 1 by means of two identical gear wheels working on each other, one of which has been mounted on the axle 16 of disk 3 and the other has been mounted on the axle of disk 5. The disks 3 and 5 will thus rotate with the same speed in opposite directions.

The spider shaft 14 is connected on one side to a pull spring 6, which is tensioned by the disk 7 of a servomotor 8 while the same spider shaft on the other side is connected with an electrical switching mechanism 9, which links the servomotor in such a manner, that the switching in of the servomotor counteracts the moving of the spider shaft, thus keeping it stationary. A simple registration-device 10 registers the rotation angle of the servomotor.

FIG. 2 indicates the manner in which the two massive disks 3 and 5 driven by the driving motor are provided with strips 4 of rubber coated fabric. Under these disks two small movable guiding rollers 11 are present, which determine the place of separation without exerting any pressure whatever on the strips 4. Under these guiding rolls are provided two pneumatic clamps 12, which are actuated with the aid of an electromagnetically directed valve system. FIG. 7 illustrates schematically by way of example how the pressure clamps 12 can be actuated and how the compression time and relaxation time can be controlled. Each clamp 12 has been provided with a piston 51 moving in a cylinder 50. The clamps 12 can be moved together by means of air pressure and are moved back to their original position by means of the spring 52, when the pressure is switched off. The timer unit 57 controls the electromagnetically actuated valve system 53 and thus the time of compression. The relaxation time can be adjusted by means of the timer unit 58.

The separating force is measured as the mechanical momentum on the axle 16 of the disk 3. This force is transmitted mechanically to a recorder. The tack strength is recorded as a line on a chart, placed on top of the instrument. A polyester film 13 travels with the two plies 4 thus preventing the rubber from sticking together where this is not wanted. A window 17 defining the area of contact between the two plies 4 to be tested is provided in the film. The apparatus can be used after setting the various timers governing the compression and relaxation time and the pressure gauge.

The device functions automatically after the plies 4 have been clamped to the wheels and the starter has been switched on.

Procedure

The plies 4 to be tested, cut to a width wider than the pressure clamps 12, are clamped to the wheels 3 and 5 whereby the surface of the plies 4 must remain untouched by hand or anything else.

When the current is switched on, the valve system 53 moves to the right hand side and in this position (as shown in FIG. 7) compressed air passes through an accurate reducing valve 55 to the cylinders 50 and moves the clamps 12 together. The pressure is controlled by the reducing valve 55 and is read from the pressure gauge 56. From this reading the pressure per square centimeter can be derived.

To obtain an even pressure on the plies 4, the clamps 12 can adjust themselves to the surface of the plies. If desired, the pressure blocks 12 may be heated to be able to apply various compression temperatures.

Rubber covered fabric plies can not be cut exactly to a specified width, while it is practically impossible to bring two plies together which cover each other completely. One strip may be wider while the other has the proper dimensions. However, even then they cannot be compressed together straight. To avoid these difficulties the plies are separated by a thin film 13 that has a great dimensional stability and shows practically no adhesion to rubber. A window 17 of the width to be used for the test is cut in this strip. By starting to compress the plies 4 at a place before the window 17 in the film 13 the "Zero" level is automatically recorded with every measurement.

The film 13 in the apparatus is endless and is led over four rollers placed in such a maner that the film runs exactly in the centre between the two large wheels 3 and 5. As the rollers 11 rotate practically without friction, the film travels along with and between the plies 4 during the separation thereon. Before each test the film 13 has to be reset in its starting position.

The timer 57 switches off the current to the valve system 53 and spring 54 moves the valve system 53 to its original position, so that the compressed air source is shut off and the cylinders 50 are connected with the atmosphere. The springs 52 move the pressure clamps 12 to the original position during the following relaxation time remain in position during the following relaxation time and separation procedure. After the relaxation time, adjusted by the timer 58, this timer 58 starts the motor 1 and the plies 4 are separated at a specified speed. The separation speed can be changed by using disks 3 and 5 of a different diameter.

The momentum necessary to drive the large wheels 3 and 5 is a measure of the tack strength. The motor 1 has enough power to prevent its speed from being seriously influenced by the adhesion of the plies 4.

The momentum necessary to turn the wheels 3 and 5 is determined by means of a differential gearing system 2 (FIG. 1). In this manner its is possible to transfer the momentum of rotation of the driving axle 15 to the spider shaft 14 with respect to a fixed point of the frame. As soon as the spider shaft 14 starts moving as a result of the momentum, this movement is detected, and starts a servomotor 8, which changes the extension and therefore the loading of a spring 6 compensating the detected movement. The elongation of the spring 6 is a measure for the transferred momentum, and this elongation is recorded. By changing the place where the spring 6 is fixed to the spider shaft 14 of the differential gearing system 2 the scale of the recorder can be varied.

The recorder is placed on top of the apparatus and writes a line on a chart. If the same chart is used for a number of tests, the average value of the tack strength can be read easily.

The momentum, that is passed via axle 14 (FIG. 6) is compensated by the spring 6. A device is present, by which the force delivered by spring 6 is controlled in such a way, that the total sum of the momentums on the shaft 14 with respect to the intersection of the center line of the shaft 14 and the coinciding produced parts of the center lines of the axles 15 and 16 is zero. This is achieved by controlling the lengthening of spring 6 by the servomotor 18 which, via the worm 19 and the wormwheel 20, drives a wheel 21, on which is fastened flexible string or leaf spring 22. The other end of the leaf spring 22 is connected with spring 6.

Depending upon the force to be delivered by spring 6 needed for the correction of the balance of axle 14, the servomotor 18 and thereby the wheel 21 are then rotated. For this purpose the servomotor 18 is guided by the detection system, which is also connected to the axle 14.

This detection system consists of two blocks 23 and 24. The block 23 is firmly connected to the axle 14 and the block 24 firmly with the frame 25. The two blocks 23 and 24 are connected with each other by two leaf springs 26, which allow only a parallel vertical displacement of the block 23 in respect of the block 24, if the axle 14 moves. The very slight parallel vertical displacement of the block 23 in respect of the block 24 is detected by a pair of leaf springs 27, of which the one side of the one spring is connected with block 23 and the one side of the other spring is connected with block 24, while on the other side the leaf springs are coupled by the coupling-pin 28, provided with contact terminals 29 and 30. If, for instance, the block 23 moves upwardly, then the pair of leaf springs 27 become distorted and the coupling-pin 28 moves to the right. By choosing the right length of the pair of leaf springs 27 and of the distance between the connecting point of the one leaf with block 23 and of that of the other leaf spring with block 24, the motion of block 23 in respect of block 24 can be enlarged about 50 times. As the detection system is built up of leaf springs, care must be taken, that the natural or resonance frequency of oscillation of this system should be higher than the measuring signal frequency, but lower than the resonance frequency of the gearing.

In the neutral position of pin 28 the terminals 29 and 30 are at a distance of about 0.5 mm. from two contacts 31 and 32, both adjustable in distance and electrically insulated from the frame 25. The coupling-pin 28 and therewith the terminals 29 and 39 are electrically connected with the electrical terminal 33 and electrically insulated from the frame 25.

If axle 14 and in consequence block 23 moves with respect to block 24 upwardly, then the pair of leaf springs 27 moves towards the right hand side, thereby electrically contacting terminal 30 and contact 32. This contact is detected by the relay 34, which may be an electronic relay that excites the servomotor 18 in such a way that the rotation of wheel 21 diminishes the lengthening of spring 6, so that the force of spring 6 on the shaft is decreased. Thereby the balance is restored on axle 14. Hereby block 23 is also restored to its original position so that the pair of leaf springs 27 stand upright again, the contact between 30 and 32 is cut off and the relay 34 interrupts the exciting of the servomotor 18. If axle 14 moves in the opposite direction the block 23 moves downwardly, whereby electrical connection between 29 and 31 takes place and the relay system 34 causes the servomotor 18 to rotate in an opposite direction, until the axle 14 is in its original position. For the adjusting of axle 14 in its datum position before a test, there is provided the fixed block 24. With the aid of the adjusting screw 35 the sliding mechanism for the block 24 can be slid both ways along the guide 36, whereafter screw 35 can be locked with the aid of nut 37. This adjustment, however, is only possible within the space between the buffer stops 38 on the opposite end of axle 14. These buffer stops protect the measuring system from overloads.

At the abovementioned distances of the terminals a movement of the axle 14 may be detected within 0.01 mm. due to the mechanical amplification. It will be clear, that the abovementioned control can still be refined. Improvement of the control is possible by measuring the movement of axle 14 continuously with the aid of elastic strips. A capacitive detector or the like. To counteract small vibrations disturbing the tranquility of the control, a viscous damping of the coupling pin 28 can be applied, by fitting a little damping plunger 40, operating in a cup 41, containing damping oil.

The registration of the momentum or the force that is necessary to deep the axle 14 in its balance takes place with the aid of a wheel 42, that is fixed on the axle of the servomotor 18. On wheel 42 and two assisting wheels 43 and 44 a string is fitted, which carries a writing pin 45. Change of the length of spring 6 by means of the servomotor 18 is linearly registered by writing pin 45 on the paper 46 by the rotation of wheel 42 simultaneously with the axle of the servomotor. The chartmotor 47 drives with uniform motion the pull off roll 48, whereby uniform movement of the paper 46 from the stockroll 49 to pull-off roll 48 occurs.

It should still be observed, that the rotation velocity of the differential must be such that the "noise" caused in the measuring signal by the gearing is higher than the top frequency response of the measuring system. This choice of the velocity of the differential is however dependent on the sensitivity of the detector. The measuring signal must be distinctly greater than the "noise" which is defined also by the friction losses in the bearings of the measuring system. The magnitude of the movements of axle 14, due to changes in the torque transmitted, is dependent on the choice of the various gears of the differential. The greater the retardation, the smaller the signal. Thus for each application then must be sought a compromise.

What is claimed is:

1. A device for testing adhesion between two materials, comprising two disks mounted in coplanar relationship with each other, the circumference of each disk being provided with clamping means for one end of each of two plies of the material compressed together, a motor and gear assembly for driving the disks at equal speed in opposite directions to cause separation of the plies, a pair of guiding rollers around which the plies are pulled apart and defining the point of separation, said pair of rollers being movable, means for measuring the separation force, recording means, means for compressing the plies together with an adjustable force during an adjustable time, means for exactly defining the test surface, said measuring means comprising differential gearing means inserted into the driving shaft system between the motor and the disks, said differential gearing means acting as a fixed gear train, the motor driving one end gear and the other end gear driving the disks, means for applying a variable force to the spider of said gear train to keep the spider stationary, a detecting system for detecting the displacement of said spider from a neutral position, means for varying the force applied thereto to return said spider to its neutral position upon displacement thereof, the recording device cooperating with the variable force applying means and recording said variable force as a function of time, the separation force being a function of the force required to maintain the spider shaft stationary as the motor drives the disks.

2. The device according to claim 1, wherein the means for compressing the plies together with an adjustable force during an adjustable time comprises a pair of pneumatic clamps, an electromagnetically directed valve for actuating the same, a pressure control device and a timer to switch off the pressure.

3. The device according to claim 1, wherein the means exactly defining the test surface comprises a thin endless film of a material which is substantially non-adhesive to the material to be tested, a window in said film defining the test surface, four rollers for guiding the film centrally between said disks, said film traveling along with and between the two plies during the separation procedure, said window being disposed between the pressure clamps in the starting position of the test procedure.

4. The device according to claim 1, wherein the pair of movable guiding rollers are arranged so that in the starting position of the test procedure said rollers are remote from each other, said rollers moving towards each other simultaneously with the pressure clamps, said rollers leaving an opening for the passage of the plies compressed together without exerting pressure on the strips, and remaining in this position till the end of the test procedure.

5. The device according to claim 1, wherein the detecting system for detecting the displacement of the spider from a neutral position due to the change of the force working thereon comprises a first block firmly connected to one end of the spider shaft, a second block firmly connected to the frame of the device and a pair of substantially parallel running leaf springs, the first block being connected to one end of one leaf spring and the second block to one end of the other leaf spring, the other end of the leaf springs being coupled to each other by a coupling pin, so that a displacement of the shaft causes a displacement of the coupling pin, whereby an electrical contact is made, the detecting system further comprising a servomotor and an electrical contact detecting relay for said servomotor said motor controlling the means for varying the force applied to the spider to return said spider to its neutral position upon displacement thereof, the electrical contact being cut off when the spider is in its neutral position again.

6. The device according to claim 1, wherein the means for varying the force applied to the spider shaft to return said spider to its neutral position upon displacement thereof consists of a spring, one end of which is connected to the end of the spider shaft and the other end of which spring is fastened to a spring slung around the axle of the servomotor so that the rotation of this motor controls the lengthening of the spring and the force of the spring on the spider shaft to bring the spider in its neutral position again.

References Cited

UNITED STATES PATENTS 2,831,346 4/1958 Brescka et al. _____ 73—150
2,834,205 5/1958 Pickup _____ 73—150

FOREIGN PATENTS 160,023 5/1964 Russia.

LOUIS R. PRINCE, *Primary Examiner.*

J. NOLTON, *Assistant Examiner.*